United States Patent [19]

Ogawa et al.

[11] 3,730,302
[45] May 1, 1973

[54] DISC BRAKE INCLUDING VIBRATION DAMPENING MEANS

[76] Inventors: Tokuo Ogawa, 1-82, Umeta-cho, Tsushima-shi; Tatsumi Sakano, 9-117-2, Nakamura-cho, Nakamura-ku, Nagoya-shi; Shigeyoshi Okamura, 15-7, Choshida, Nagakuwa, Nagokute-mura, Aichi-gun, all of Japan

[22] Filed: May 19, 1972

[21] Appl. No.: 254,946

Related U.S. Application Data

[62] Division of Ser. No. 33,707, May 1, 1970, Pat. No. 3,684,061.

[52] U.S. Cl. ................................. 188/73.5, 188/1 B
[51] Int. Cl. ............................................. F16d 65/02
[58] Field of Search .................... 188/1 B, 73.5, 73.1, 188/205 A, 264 B, 264 G

[56] References Cited
UNITED STATES PATENTS

| | | | |
|---|---|---|---|
| 2,214,104 | 9/1940 | Hildabolt et al. | 188/264 B |
| 3,429,405 | 2/1969 | Frigger | 188/73.5 X |

*Primary Examiner*—George E. A. Halvosa
*Attorney*—Theodore Bishoff

[57] ABSTRACT

A disc brake of simple construction wherein an intermediate member such as a metal powder sintered product retaining lubricating material such as oils and fats is provided between the pad and the piston, and a protecting cover is fitted over said intermediate member to prevent the leakage of said lubricating material and to retain the lubricating material for a long time. The protecting cover slides with the pad, or piston, relative to the porous intermediate member during braking, while the intermediate member reduces the frictional force between opposed surfaces of the pad and the piston thus preventing brake squeal.

10 Claims, 6 Drawing Figures

Patented May 1, 1973
3,730,302

DISC BRAKE INCLUDING VIBRATION DAMPENING MEANS

This application is a divisional application of our copending application Ser. No. 33,707, filed May 1, 1970, now U.S. Pat. No. 3,684,061.

BACKGROUND OF THE INVENTION

In conventional disc brakes an uncomfortable and objectionable "brake squeal" occurs when the brakes are applied.

A great many attempts have been made to improve the frictional material and the method of damping, none of which, however, has accomplished the essential object of preventing the brake squeal.

The present invention has been achieved by experiment and analysis from which it was learned that the described brake squeal arises from the torsional vibration of the brake pad in pressing against the disc and the resultant vibration of the brake disc. The torsional vibration of the pad is produced by frictional torque between the pad and the disc because there is a distance, equal to the thickness of the pad, between the point of action of the pressing force by piston, or the like, and that of the frictional force on the disc surface. It was further determined that said torsional vibration can be prevented by minimizing the friction between the pad and the pressing means such as the piston.

It is a primary object of the present invention to provide disc brakes in which brake squeal is prevented for a long period of use of the brakes.

It is another object of the present invention to provide means for preventing brake squeal which can be applied to conventional disc brakes.

It is a further object of the present invention to provide means for reducing the frictional force between the pad and the piston by interposing a porous intermediate member impregnated with a lubricating material and applying a protective cover to the intermediate member which prevents loss and leakage of the lubricant.

SUMMARY OF THE INVENTION

The objective of preventing the brake squeal for a long time with a simple construction has been attained in the present invention by providing an intermediate member retaining lubricating material such as oils and fats between opposed contact surfaces of the pad and the piston. The intermediate member may be attached to either the pad or the piston. Preferably the side peripheral surface and the surface opposite the contact surface of said intermediate member are covered with a protecting cover having a bottom, the sidewall of said protecting cover being fixed at one side peripheral surface of said intermediate member by means of a resilient material such as heat-resisting rubber in such manner that the cover may slide relative to the intermediate member when the brake is applied, thus preventing torsional vibration and squeal. The inner bottom surface of said protecting cover may be engaged by the intermediate member, or, a space may be provided to receive additional lubricant.

BRIEF DESCRIPTION OF THE DRAWINGS

The invention will best be understood from the following description of specific embodiments when read in connection with the drawings, wherein like reference characters indicate like parts throughout the several Figures, and in which.

DESCRIPTION OF THE PREFERRED EMBODIMENTS

Figure 1:
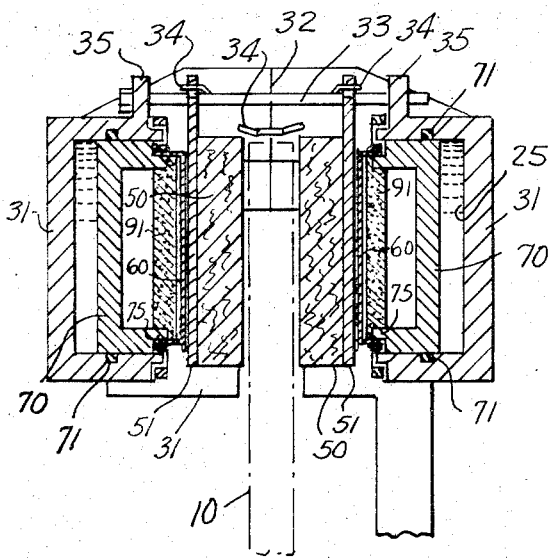
FIG. 1 is a vertical central section showing a disc brake according to the present invention.

For a more complete understanding of the complete wheel and disc brake assembly to which this invention is applicable, reference is made to our above mentioned copending application. For a more brief explanation, reference is made to FIG. 1 showing a Girling type disc brake mechanism straddling the disc 10 and held within opposite sides 31 of a caliper. Pads 50, which may be formed of conventional friction, or brake material, are supported in the caliper sides 31 and are disposed on both sides of the brake disc 10. The major portion of the caliper between the opposed surfaces of half portions 31 provides a space in which the brake disc 10 rotates. The two half portions 31 abut at their connecting surfaces 32 and are rigidly fixed together by bolts (not shown). Cylinders 25 are formed in opposite portions 31 which open toward the disc brake 10, and pistons 70 are respectively fitted into said cylinder. At the forward ends of pistons 70 are provided the pads 50 which are pressed against the brake 10 by the pistons. Each pad 50 is provided with a backing plate 51 against which a porous plate 91 made of sintered iron powder and impregnated with grease is pressed. The backing plate 51 is made of metal and serves to prevent the contact of the pad with grease and to suspend and reinforce said pad 50. At the upper part of the pad backing plate 51 are provided two holes 102 (FIG. 5) for suspending the pad and a hole 101 for engaging a spring 34.

Two detachable rods 33 extend between fixed walls 35 respectively provided at the upper part of the opposed surfaces of the caliper. Said rods are held in place by pins (not shown) and are loosely fitted into the holes 102 of the pad backing plates 51 to suspend the two pads 50 with their friction surfaces opposed to the opposite sides of disc 10. The spring 34 is bent into M shape and each of its two side legs has three bent portions which bear against plate 51 and press a porous plate 91 on the back surface of pad 50 against its adjacent piston 70. The curved portions of spring 34 are engaged over one of the rods 33. Each free end of the side legs of spring 34 is engaged in the hole 101 of one of the pad backing plates 51, whereby the pad 50 is pressed toward its adjacent piston 70 by resilient force of the spring 34. As thus disposed, a pertinent interval is formed between the friction surfaces of pads 50 and the surfaces of the brake disc 10.

The piston 70 for pressing the pad 50 against the brake disc 10 is of a cylinder shape with a bottom. The bottom surface of the piston is arranged next to the working oil within the cylinder 25, and the forward open end 75 of the piston is disposed in the opening of the cylinder 25 adjacent to the back surface of the pad 50. In an annular groove provided on the inner peripheral surface of the cylinder 25 is secured an O-ring 71 to maintain the fluid-tightness between the outer peripheral surface of the piston 70 and the inner peripheral surface of the cylinder 25. Between the outer peripheral surface of the forward end 75 of the piston 70 and the caliper side 31 and secured in engagement with both of them is a ring-shaped boot 72 (FIG. 2) for preventing entrance of dust.

Both cylinders 25 are connected through an oil path (not shown) provided in the half portions 31 of the caliper and communicated at a portion 32 where said half portions 31 are connected. A hydraulic pipe leading to a master cylinder (not shown) is connected to said oil path.

The disc brake, as described above, is formed so that the pressure working oil is conducted into each cylinder 25 from the master cylinder in order to brake the rotating disc 10. Each piston 70 slides in the cylinder and its forward end 75 presses the porous plate 91 at the back surface of the pad 50 toward the disc 10. The pad 50 pressed at its back surface is moved by plate 91 toward the brake disc 10 along the rod 33, loosely fitted into holes 102 at the upper part of the backing plates 51, pressing the rotating disc 10, and the frictional force between the pad 50 and the brake disc 10 brakes the rotation of the disc 10.

As the grease impregnated porous plate 91 is provided at the back surface of the pad 50 to be contacted by the forward end 75 of the piston, the frictional force between the contacting surfaces is greatly decreased by lubrication of the grease, and such friction becomes extremely small as compared with the frictional force between the brake disc 10 and the pad 50. The pad 50 slides in the rotational direction of the brake disc 10 relative to the forward end 75 of the piston within the allowance of the clearance between the hole 102 of each pad backing plate 51 and the rod 33, and the frictional force between the brake disc 10 and the pad 50 is converted into the braking force with the contact area of the pad against an inside wall of the caliper sleeve as a point of reaction force. During braking, the frictional force between the forward end 75 of the piston (through cover 60 to be described) and the pad 50 (through the pad backing plate 51) is so small, as mentioned above, that it generates no torsional vibration, thereby preventing the occurrence of brake squeal.

Since a porous plate 91 made of sintered iron powder and impregnated with grease is used, the lubricating capacity is perpetual. There is further obtained a damping effect because of the appreciable flexibility of the porous plate 91, so that the prevention of the brake squeal is more effective. Because of the flexibility of the porous plate 91, grease is released between the slidable surfaces of the cover 60 and the piston 70 at the time of braking. During times of non-braking, grease is absorbed in the pores of the porous plate 91 by recovering from flexion, whereby grease is maintained for a long time and the deterioration of lubricating capability is avoided.

Figure 2:
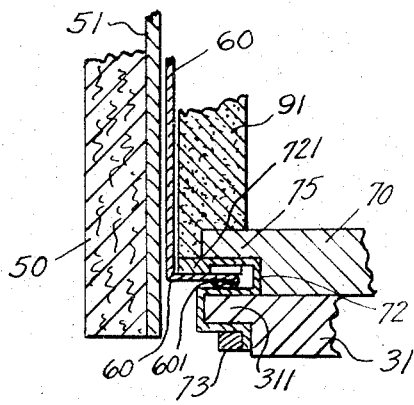
FIG. 2 is a fragmentary enlarged, sectional view of opposed surfaces of a pad and a piston, corresponding to a portion of FIG. 1.
Figure 3:
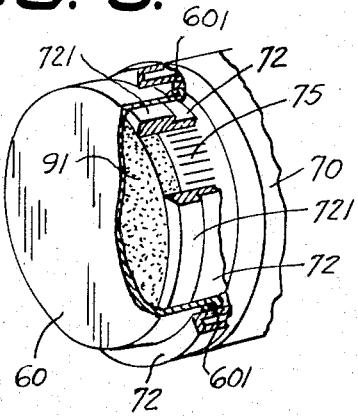
FIG. 3 is a partly broken perspective view of a forward end of the piston of FIGS. 1 and 2.

FIGS. 2 and 3 illustrate the first embodiment of the invention in greater detail as including the protection cover 60 provided on the surface of the sintered metal plate 91 impregnated with grease opposed to the pad 50 and backing plate 51. The porous plate 91 is secured to the forward end 75 of the piston and has a main body portion having the same outer diameter as that of the forward end 75 of the piston and a thickened central portion having the same diameter as the inner diameter of said forward end 75 to project slightly into the piston 70 for frictional securement thereto. The ring-shaped boot 72 is of heat and oil-resisting soft rubber for preventing entrance of dust and is provided between the forward end 75 of the piston and the forward end 311 of the half portion 31 of the caliper, and in engagement with both of them.

The boot 72 has a cross-section in its diametrical direction almost of a Z-shape with its lower opening fitted to the forward end 311 of the caliper half portion 31 and its upper end (inner peripheral surface of the ring boot) fitted to the outer peripheral surface of the forward end 75 of the piston and outer peripheral surface of porous plate 91. The boot 72 is fixed at the forward end 311 by a fixing ring 73 closely fitted to the outer periphery of the boot 72.

The protecting cover 60 is of shallow, cylindrical shape having a bottom and is fitted detachably to the plate 91. Cover 60 has a flat bottom surface and a sidewall having a forward end 601 bent outwardly in a rounded, beadlike shape. By inserting the forward end 601 of the cover 60 into the inner opening of the ring boot 72, the inner periphery of the sidewall of said cover 60 is fitted to the projection 721 provided on the inner peripheral surface of said boot opening, and thereby the inner bottom surface of said cover is contacted against the surface of the plate 91 opposite the pad 50. The projection 721 of the boot acts as a resilient body, the outer diameter of which is appreciably larger than the inner diameter of said cover 60 which thereby is fixedly secured to the boot 72.

The opposed surfaces of the protecting cover 60 and the pad backing plate 51 have no lubrication and, therefore, the frictional force between them is large. However, the frictional force between the opposed surfaces of the protecting cover 60 and the sintered metal plate 91 is greatly reduced by lubrication of grease. The inner peripheral surface of the sidewall of said protecting cover 60 is resiliently engaged by the projection 721 of the soft rubber boot 72, and due to the large frictional force between the pad 50 and the cover 60 during braking, the pad 50 vibrates integrally with the backing plate 51 and the cover 60, relative to the plate 91 at the forward end of the piston within the allowance of the clearance between the inner diameter of the hole 102 of each pad backing plate 51 and the rod 33 inserted therein.

Normally, the frictional force between the pad backing plate 51 and the forward end 75 of the piston would cause torsional vibration on the pad 50. However, in this case, the frictional force between the protecting cover 60 and the sintered metal plate 91 at the forward end 75 of the piston is extremely small, and as a result the mentioned torsional vibration is avoided, thereby preventing brake squeal.

Grease for reducing the frictional force between the pad 50 and the piston 70 is applied in sintered metal plate 91, the outer surface of which is sealed by the protecting cover 60 as above described, so that grease will not leak nor evaporate to the outside due to frictional heat generated between the disc 10 and the pad 50, or between the pad 50 and the sidewall of the caliper during braking. Further, flow-out or pollution of the grease by invasion of water or dust from the outside, or pollution of the grease emanating from the forward end of the piston and the pad backing plate 51 of the pad are prevented. The lubricating capacity is, therefore, permanent.

Due to a slight flexibility of the sintered metal plate, it is possible to release grease between the contact surfaces of the inner bottom of the protecting cover 60 and the plate 91 during braking, and to absorb the grease in the pores of the plate 91 when the latter recovers its initial form during non-braking, so that grease is maintained for a long time and its deterioration is prevented.

Because the forward end 601 of the sidewall of the protecting cover 60 is bent outwardly in a rounded shape, as described above, the boot is not damaged by the cover during initial attachment or any subsequent vibrations.

According to other embodiments of the present invention, heat-resisting fibers impregnated with grease may be filled in a space formed between the sintered metal plate 91 and the concave portion of the piston 70 in the first embodiment so as to increase the content of the grease.

Further, in the first embodiment, the sintered metal plate 91 and the inner peripheral surface of the piston 70 may be fitted loosely with some clearance so that the sintered metal plate 91 may appreciably vibrate in said clearance during braking, and thus exhibit a better effect in preventing brake squeal.

Figure 4:
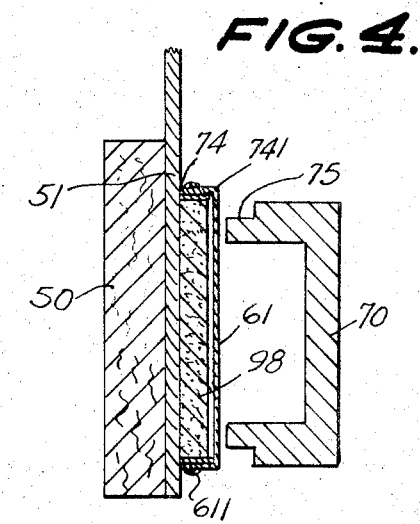
FIG. 4 is a vertical section of opposed surfaces of a pad and a piston of a disc brake according to another embodiment of the invention.
Figure 5:
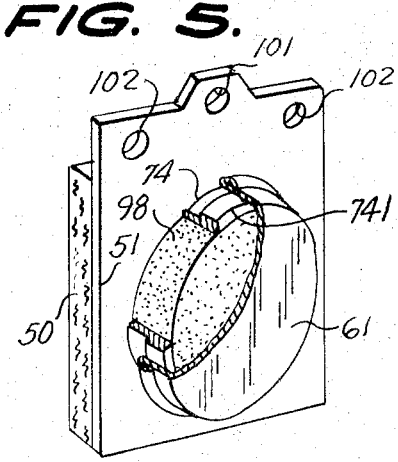
FIG. 5 is a partly broken perspective view of opposed surfaces of the pad and piston of FIG. 4.

The second embodiment of the invention is shown in FIGS. 4 and 5 as including a sintered metal plate 98 impregnated with grease and a protecting cover 61, the plate being attached to the surface of the pad backing plate 51 which is opposed to the piston. The plate 98 is cylindrical and made of iron powder sintered material impregnated with grease. This plate is adhered to pad backing plate 51 by an adhesive having strong adhesion. On the peripheral surface of plate 98 is fitted a rubber ring 74 having an outward projection 741 on the outer peripheral surface, and a cylindrical protecting cover 61 is detachably secured to said ring 74 in the same manner as in the first embodiment. The outer diameter of the projection 741 of the ring 74 is appreciably larger than the inner diameter of the sidewall 611 of the protecting cover 61 so that the ring and cover are closely fitted.

In the second embodiment, the protecting cover 61 is brought into close contact with the forward end 75 of the piston by a large frictional force between them, and as the frictional force between the opposed surfaces of the protecting cover 61 and the sintered metal plate 98 is greatly reduced by lubrication of grease, the pad 50 vibrates integrally with the backing plate 51 and the intermediate member 98, relative to the protecting cover 61 integrally engaged to the forward end of the piston during braking, and the same resultant effect is obtained as in the first embodiment.

The above are descriptions of embodiments wherein a sintered metal plate is employed as an intermediate member for retaining and supplying the lubricating material. Furthermore, heat-resisting soft rubber is used as a resilient body between the side peripheral surface of the intermediate member and the inner surface of the sidewall of its protecting cover, but said resilient body may be oil and heat-resisting plastic, or the like having resiliency, and it may be manufactured integrally with a boot as shown in the first embodiment (FIGS. 2 and 3).

Figure 6:
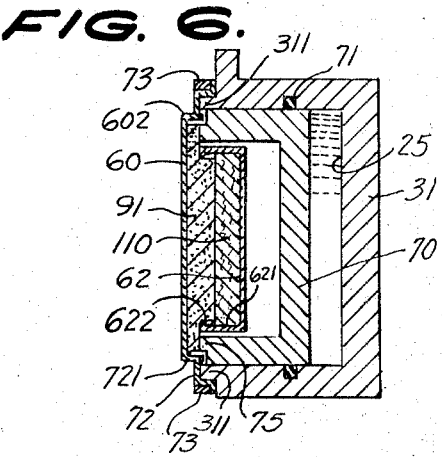
FIG. 6 is a vertical section of the piston side of the brake assembly according to still another embodiment of the present invention.

In the third embodiment shown in FIG. 6, the sintered metal plate 91, secured to the forward end 75 at the opening of the piston, has an outward flange projecting from its stepped portion and engaged with the forward end of the piston at the periphery of its back surface, the cross-section of the flange being preferably of convex shape, and grease is applied to the entire body of the plate 91.

A protecting cover 60 is fitted to the forward surface of the sintered metal plate 91 opposed to the pad in the same manner as in the first embodiment (FIGS. 2 and 3). Cover 60 has a flat bottom surface parallel to said surface of plate 91 and the pad backing plate. The inner bottom surface of said cover 60 contacts the forward surface of plate 91 and the inner peripheral surface of the sidewall 602 of said cover 60 is fitted to the outer peripheral surface of the plate 91 over a projection of the soft rubber boot 72.

A tray 62 having a wall 621 and a bottom is secured to a projection, forming a thickened portion of the sintered metal plate 91 and being loosely fitted with a clearance into the opening of the piston, so as to form a space between the projection of the sintered metal plate 91 and inner bottom surface of the tray 62. This space is filled with asbestos fiber 110 including grease so as to increase the amount of grease available in the brake assembly.

Between the inner surface of wall 621 of the tray and the sidewall of the projection, there is provided an oil-proof soft rubber ring 622, and since the inside diameter of wall 621 is a little smaller than the outer diameter of the rubber ring, the ring does not come off during use.

The opposed surfaces of the sintered metal plate 91 and the pad backing plate 51 are parallel and slightly spaced apart. They extend at right angles to the direction of movement of the piston 70 and the pad 50.

As described, the third embodiment is constructed similar to the first embodiment (FIG. 2), and the occurrence of brake squeal is prevented in the same manner.

During braking, the frictional force between opposed contact surfaces of the pad backing plate 51 and the protecting cover 60 is large and they vibrate together, while the frictional force between the inner bottom surface of the protecting cover 60 and the sintered metal plate 91 is very small because of the lubrication by the grease on said surfaces. Thus, the protecting cover 60 slides relative to the plate 91, whereby the same results as obtained as described for the first embodiment are achieved.

In the third embodiment, the forward surface of plate 91 is covered by the protecting cover 60 to prevent grease from leaking out, or evaporating, and to prevent damage by entrance of water or dust from outside. Further, the leakage of grease into the concave portion of the piston is prevented by the tray 62. And thus the grease is retained for a long time by the protecting cover and the tray so that brake squeal is prevented for a long time.

The sintered metal plate may be fixed to the forward end of the piston, or closely inserted into the concave portion of the piston, but when it is loosely inserted with a clearance as in FIG. 6, brake squeal is prevented more effectively, and the setting and removing of the sintered metal plate can be done more easily.

In a modification of the third embodiment, the asbestos fiber 110 impregnated with grease may be removed and the tray 62 may be closely fitted on the projection of the sintered metal plate 91.

The present invention as described above can be simply and inexpensively applied in pads and pistons of conventional disc brakes already fabricated, or used and, therefore, it can be widely utilized.

The invention contemplates use as lubricating material not only oils and fats such as grease, but metal powders having lubricating nature such as disulphuric molybdenum. A mixture of grease and disulphuric molybdenum, or the like, can also be used.

For a protecting cover, a metal plate which does not rust, or which is treated with rust prevention is used, including for example, stainless steel, chrome plated iron plate, nickel plated iron plate, and the like.

For illustration of embodiments of the present invention, descriptions have been made with reference to disc brakes of the Girling type, but the present invention can be applied in any preferred type of the disc brake and desired modifications are possible without departing from the spirit and scope of the invention.

We claim:

1. A disc brake including a rotatable disc, a caliper straddling a portion of the periphery of said disc, a pad of friction material associated with said caliper and opposed to said disc, an axially movable piston in said caliper, and pressure fluid actuating means for moving said piston to force said pad into frictional engagement with said disc for braking action, in combination with an intermediate member, positioned between the opposed surfaces of said pad and piston, said member being made of a sintered metal plate impregnated with lubricating material and being secured to one of said piston and pad, and a protecting cover detachably secured to said intermediate member and disposed on the side opposite to the side of the member which is fixed to said piston or pad, said protective cover being pan-shaped and having bottom and sidewalls, said bottom wall of the cover being relatively slidable on the opposed surface of the intermediate member, whereby to prevent leaking of the lubricating material, eliminate torsional vibration, and prevent brake squeal.

2. A disc brake according to claim 1, wherein said intermediate member is secured to said piston.

3. A disc brake according to claim 1, wherein said intermediate member is impregnated with grease as said lubricating material.

4. A disc brake according to claim 1, wherein said intermediate member is secured to said pad.

5. A disc brake according to claim 4 wherein said intermediate member is a cylindrical plate made of iron powder sintered material impregnated with grease and is adhered to a surface of a backing plate which is secured to said pad, and said protecting cover is detachably secured to an outwardly facing peripheral surface of a ring member fitted on the peripheral edge surface of said intermediate member.

6. A disc brake according to claim 2, wherein said piston is provided with a concave portion and an annular forward end portion opposed to said pad, said intermediate member having an annular stepped portion on its periphery which is secured to said annular end portion of the piston.

7. A disc brake according to claim 6, wherein a heat-resisting fiber impregnated with lubricating material is provided in the space between said intermediate member and said concave portion in the piston.

8. A disc brake according to claim 6, wherein said stepped portion of the intermediate member is a circular sintered metal plate impregnated with grease and having a peripheral projecting flange which is fitted against the edge of said annular end portion of the piston, a soft rubber ring boot having a cross-section in its diametrical direction of substantially Z-shape having a part clamping said flange of the intermediate member and said annular end portion of the piston and a second part clamped about a cylinder portion of said caliper by a fixing ring, and said sidewall of said protecting cover being resiliently engaged over a projection of said ring boot.

9. A disc brake according to claim 6, wherein said intermediate member is further provided with a tray surrounding said annular stepped portion of the intermediate member and surrounded by said annular portion of the piston, said tray serving to retain the lubricating material impregnated in the intermediate member.

10. A disc brake according to claim 9, wherein a heat-resisting fiber impregnated with lubricating material is filled in a space provided between said intermediate member and said tray.

* * * * *